(12) United States Patent
Dai et al.

(10) Patent No.: US 6,922,890 B2
(45) Date of Patent: Aug. 2, 2005

(54) PLANARIZATION PROCESS FOR THIN FILM SURFACES

(75) Inventors: Qing Dai, San Jose, CA (US); Jennifer Qing Lu, San Jose, CA (US); Dennis Richard McKean, Milpitas, CA (US); Eun Row, San Jose, CA (US); Li Zheng, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 10/295,382

(22) Filed: Nov. 15, 2002

(65) Prior Publication Data

US 2004/0093719 A1 May 20, 2004

(51) Int. Cl.$^7$ ................................................ H05K 3/30
(52) U.S. Cl. ............................. 29/841; 29/855; 29/856; 29/858; 29/867; 29/883; 29/885; 156/268; 156/344; 427/207.1; 427/208.08; 264/272.1; 264/272.11; 264/272.15; 438/455; 438/458; 438/976
(58) Field of Search ....................... 29/841, 855, 856, 29/858, 867, 883, 885; 264/272.1, 272.11, 272.15; 427/207.1–208.8; 156/268, 344; 438/455, 458, 976

(56) References Cited

U.S. PATENT DOCUMENTS

| | | | |
|---|---|---|---|
| 5,095,613 A | 3/1992 | Hussinger et al. | ............. 29/603 |
| 5,365,700 A | 11/1994 | Sawada et al. | ................ 451/28 |
| 5,468,177 A | 11/1995 | Kindler et al. | .............. 451/364 |
| 5,516,430 A | 5/1996 | Hussinger | ...................... 216/36 |
| 5,911,850 A | 6/1999 | Zung | ......................... 156/344 |
| 5,932,113 A | 8/1999 | Kurdi et al. | ................... 216/22 |
| 6,045,431 A | 4/2000 | Cheprasov et al. | ............. 451/5 |
| 6,093,083 A | 7/2000 | Lackey | .......................... 451/28 |
| 6,129,855 A | 10/2000 | Sawada et al. | ................ 216/22 |
| 6,720,561 B2 * | 4/2004 | Baumgartner et al. | . 250/370.11 |
| 6,794,751 B2 * | 9/2004 | Kumamoto | .................. 257/738 |
| 6,806,725 B2 * | 10/2004 | Tsui et al. | .................... 324/755 |

FOREIGN PATENT DOCUMENTS

| | | | | |
|---|---|---|---|---|
| JP | 58166345 A | * 10/1983 | ............ G03C/1/58 |
| JP | 89004339 B | 1/1989 | ........... B29C/65/48 |
| JP | 06067310 A | 3/1994 | ........... G03B/27/02 |

OTHER PUBLICATIONS

"A new sub–femto slider for mass production planar silicon heads"; Lazzari, J.–P.; Pisella, C.; Tosi, L.; Magnetics, IEEE Transactions on , vol.: 34 , Issue: 4 , Jul. 1998; pp.: 1690–1692.*

* cited by examiner

Primary Examiner—Paul D Kim
(74) Attorney, Agent, or Firm—Robert B. Martin; William D. Gill

(57) ABSTRACT

A method is provided for planarization of structures which minimizes step heights, reduces process steps, improves cleanliness, and provides increased ease of debond. Structures are placed with working surfaces facing down onto an adhesive layer such that structures remain fixed during heating. A bi-layer encapsulating film is used to achieve planarization. A carrier is bi-laminated with a thermoplastic film layer followed by a chemically inert protective polymer film layer that can withstand etch and cleaning processes. The thermoplastic layer is laminated on top of the carrier; the polymer layer is laminated on top of the joined thermoplastic layer and carrier. The carrier with bi-layer film is then placed onto the backside of the structures to resist chemical attack from the front side during photostrip and enable planarization. When heat is applied, the bi-layer encapsulating film melts and pushes the polymer layer into the gaps between structures thereby achieving complete planarization.

23 Claims, 4 Drawing Sheets

PLANARIZATION PROCESS FOR THIN FILM SURFACES

BACKGROUND OF THE INVENTION

1. Field of the Invention

This invention relates to the preparing of structures for etch patterning. More specifically, the invention relates to a planarization process for preparing thin film structures for etch patterning to form the air-bearing surface of a slider for use in a hard drive assembly.

2. Description of Related Art

Conventional magnetic disk drives are information storage devices that utilize at least one rotatable magnetic media disk with concentric data tracks. Read/write transducers are used for performing reading and writing functions on the various data tracks, and storage densities can be improved by utilizing separate transducers such as magnetoresistive and giant magnetoresistive heads. Transducers are typically mounted on the underside of an air bearing slider, which flies relative to the rotating media disk, slightly above the data track. A suspension assembly is used for resiliently holding the slider over the data tracks, and a positioning actuator connected to the suspension moves the transducer across the media to a desired data track and maintains transducer position during a read or a write operation.

A limiting factor in the recording density of a magnetic disk drive is the distance between the transducer and the magnetic media. One goal of air bearing slider design is to "fly" a slider as closely as possible to the magnetic medium without making physical contact with the medium. Smaller spacings, or "fly heights," are desired so that the transducer can distinguish between the magnetic fields emanating from closely spaced data regions on the disk.

In addition to achieving the smallest possible spacing between the media and transducer, it is also critical that a slider maintain this constant spacing over time. The range of conditions that transducers experience during the normal operation of a disk drive can cause great variations in fly height constancy. When fly heights are not constant, data transfer between the transducer and recording medium may be adversely affected.

Physical features on the air bearing surface ("ABS") portion of a slider, as well as the manufacturing methods and fabrication materials used, in large part define the slider fly height. The utilization of batch manufacturing processes often introduces variations in the physical characteristics of resultant sliders, which in turn will cause fly height variations in the hard disk assembly. If these variations are too large, nominal slider fly heights must be increased in order to compensate.

In the past, the processes for defining ABS's included using a dry-film resist as the etch mask for a single etch step. Most current air-bearing surface features, however, are formed using two or more etch steps to improve fly height and better fly height control. Moreover, slider airbearing designs for lower fly height may include small pads or other features that are difficult to pattern using dry film resists. Liquid resists have much better resolution capabilities and have been preferred for forming small air-bearing design features and lowering overall etch step heights.

Current slider manufacture methods utilize strips of slider material which are positioned in rows on a carrier with the ABS side exposed upwards to allow for the eventual patterning of the ABS. After the ABS's are formed the strips of slider materials are diced into separated individual sliders. The liquid resists are typically applied by spin coating groups of sliders at a time. In order to spin coat the liquid resist, the group of sliders must be substantially coplanar, with step heights of less than 5 $\mu$m between the sliders. Uniformity in the thickness of resist coatings during the etching process is achieved by minimizing these step heights.

In processing multiple etch designs, ion milling or reactive ion etching (RIE) processes are sometimes used for each etch step. If certain slider row spacings exist, the ion milling etch process results in the formation of redeposited materials on the sides of the rows which cannot be removed. In addition, both ion milling and RIE yield shallow wall profiles which make slider inspection difficult and also affect slider flight characteristics.

Reducing step heights between the air bearing side of sliders for etch patterning is a process generally referred to as planarization. Some planarization processes involve filling in the gaps of sliders on the carriers with a polymeric material, which not only reduces the step height between the slider rows, but also prevents redeposit of etched materials in the gaps.

U.S. Pat. No. 5,516,430 to Hussinger provides a planarization procedure that uses alignment fixtures to accommodate liquid resist applications. A filled thermoplastic material is placed on the rows with a substrate on top. The structure is heated to 400–500° F., causing the encapsulating material (or encapsulant) to melt and flow into the gaps between the rows. The heating process is controlled by maintaining the alignment fixture near ambient temperature to prevent sticking between the encapsulant and fixture. Sufficient heat is applied to melt the material near the air-bearing surface, which may contain thermally sensitive transducers. One problem with this process is the potential seepage of encapsulant onto the air-bearing surface of the slider, which causes photoresist adhesion and imaging problems.

U.S. Pat. No. 5,932,113 to Kurdi, et al. (hereinafter referred to as the "Kurdi patent") provides a process for preparing an air-bearing slider that uses an adhesive film and an acrylic encapsulating fluid to fill the recesses between the rows during etching. According to the Kurdi patent, the thin films to be etched are applied to a carrier, each of the thin films separated by a recess. Each of the thin films may comprise a transducer-laden ABS. An adhesive film is then generally applied to the ABS side of the thin films. A fluid is then deposited in the recess and held in place by the adhesive film. The fluid may then be cured and the adhesive film removed to provide a planar surface. The ABS side of the row may then be patterned for use by appropriately using an etch mask coating and developing process.

Both Kurdi and Hussinger processes involve the use of an acrylate encapsulant due to the fact that multiple photo/etch steps are necessary to achieve planarization. To enable multiple photo/etch steps, the material used to fill the gaps of sliders must be able to resist process solvents such as propylene-glycol-methyl-ether-acetate or NMP (N-methyl-pyrrolidone) types of solvent during photo/strip. At the same time, these encapsulants must be removed during debonding with NMP. The encapsulant used to fill the gap typically starts out in liquid form, such as acrylate, and becomes cross-linked once it fills the gap of sliders. The cross-linked acrylate can generally withstand the multiple solvent exposures during photo/strip. The cured encapsulant is difficult to remove however because it is insoluble in organic solvents due to the cross-linking, and it bonds well to the slider substrate (e.g., Si/N-58 ceramic). During debonding, an additional process must be employed to mechanically shear off the cross-linked acrylate prior to chemical debonding. This mechanical debonding process causes chips, cracks, and heavy contamination.

Another problem with these prior art processes is incomplete planarization. Encapsulant is introduced into the recesses or gaps between slider rows by capillary action. Blockage of the gaps due to bonding tape or impurities will give rise to incomplete planarization. The same problem results from bubbles in the encapsulating fluid. Another problem is the inability to easily remove all of the encapsulant during the debond process.

Further, the current planarization processes are designed for row level processing, and would be extremely difficult to apply to the etching of ABS directly on an array of individual sliders. For example, the existing mechanical shear debonding processes of cross-linked acrylate encapsulant are neither practical nor feasible for an array of individual sliders, which would require debonding of each slider separately.

Consequently, there is a continuing need for planarization processes that will overcome drawbacks in the prior art, provide increased yields and ease of manufacturability, and which can enable the etch processing of an array of individual thin film elements such as sliders.

SUMMARY OF THE INVENTION

The present invention provides a method for planarization of thin film structures to prepare the operative/working surfaces for etching. The present invention also provides a method to planarize single thin film structure surfaces, which has not been possible before. The present invention provides for minimal step heights, reduced process steps, improved cleanliness, and simplification of the debonding processes currently known. The present invention can be more easily explained by using air bearing sliders as an example of thin film structures which can be planarized using this method. However, it is understood that the present invention can be implemented generally to other types of thin film structures without departing from the scope or spirit of the present invention.

In one aspect of the present invention, a backside flow method is used in conjunction with an encapsulating film to planarize the front side of sliders for processing. Sliders are placed facing down onto an adhesive layer which has been pre-placed on a retaining surface for keeping the sliders in position during subsequent handling and processing. A carrier with prepared encapsulating film is placed onto the back side of the sliders. The encapsulating film is flowed so that it fills the gaps between sliders and forms surfaces adjacent the adhesive layer which are substantially coplanar with the front side of the sliders. After the flowed encapsulant is hardened or cured, the adhesive layer is removed to expose a bonded, planarized surface of sliders and encapsulant. Sliders are then processed and subsequently debonded from the carrier by chemical and/or thermal processes.

In another aspect of this invention the encapsulating film is a double layer (bi-layer) adhesive film made up of a thermoplastic film layer and a protective release layer of polymer film. A base plate, which is used as a "carrier" for the sliders, is laminated with a thermoplastic film layer, followed by a second polymer film layer (e.g. Polyethylene), which is a chemically inert, solvent-resistant material that can withstand subsequent processing steps. When the thermoplastic layer of film is flowed, it pushes the chemically inert, thin polymer layer of film down to flow into and fill the gaps between the sliders. Since the top most surface of the gaps between sliders is protected by the chemically inert film, the encapsulant is resistant to solvents during stripping and cleaning processes involving chemicals sprayed on the top of the carrier.

In a further aspect of the present invention, a hot vacuum laminator is used during the preparation of the bi-layer film on the carrier in order to avoid air bubbles or other impurities that could impair complete coplanarity of sliders. The thermoplastic adhesive is vacuum laminated on top of the carrier; the second protective film layer is vacuum laminated on top of the joined thermoplastic adhesive and carrier.

In yet another aspect of the present invention, a chemical and/or thermal debond process may be used after the planarization step to remove sliders or rows from the encapsulant using little or no physical/mechanical force (e.g. shearing or cutting). The carrier, supporting sliders/rows and encapsulant, can be heated to reflow the encapsulant causing sliders/rows to be released. Sliders/rows can be removed by robotic or similar non-forceful means, minimizing the chance for damage or contamination or the sliders during removal. Removed sliders/rows are then cleaned using chemical and/or ultrasonic processes. Alternatively, the carrier, supporting sliders and encapsulant, can be placed in a solvent which dissolves the encapsulant. As the encapsulant dissolves, sliders are released and can be caught by a tray positioned beneath the carrier.

The planarization of sliders using this invention may be further improved by using a robotic device to initially place sliders on the adhesive film.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENTS

This invention is described below in reference to a preferred embodiment and drawings. While this invention is described in terms of the best presently contemplated mode of carrying out the invention, it will be appreciated by those skilled in the art that variations and improvements may be accomplished in view of these teachings without deviating from the scope and spirit of the invention. This description is made for the purpose of illustrating the general principles of the invention and should not be taken in a limiting sense. The scope of the invention is best determined by reference to the appended claims.

By way of illustration and not limitation of the inventive aspects of the planarization method of present invention, the present invention will be described below in reference to preparing thin film structures for handling and processing, and in particular with reference to thin film structures formed as sliders used in the hard drive assembly (HDA) in computer systems common in the industry. The method of the present invention is applicable to planarization of thin film structures configured singly, in rows, or generally grouped such that batch manufacturing of resultant devices is possible. The illustrated embodiment is directed to sliders configured in rows and planarized according to the present invention. It is understood that the present invention is generally applicable to planarization of thin film structures other than sliders without departing from the scope and spirit of the present invention.

Figure 1:
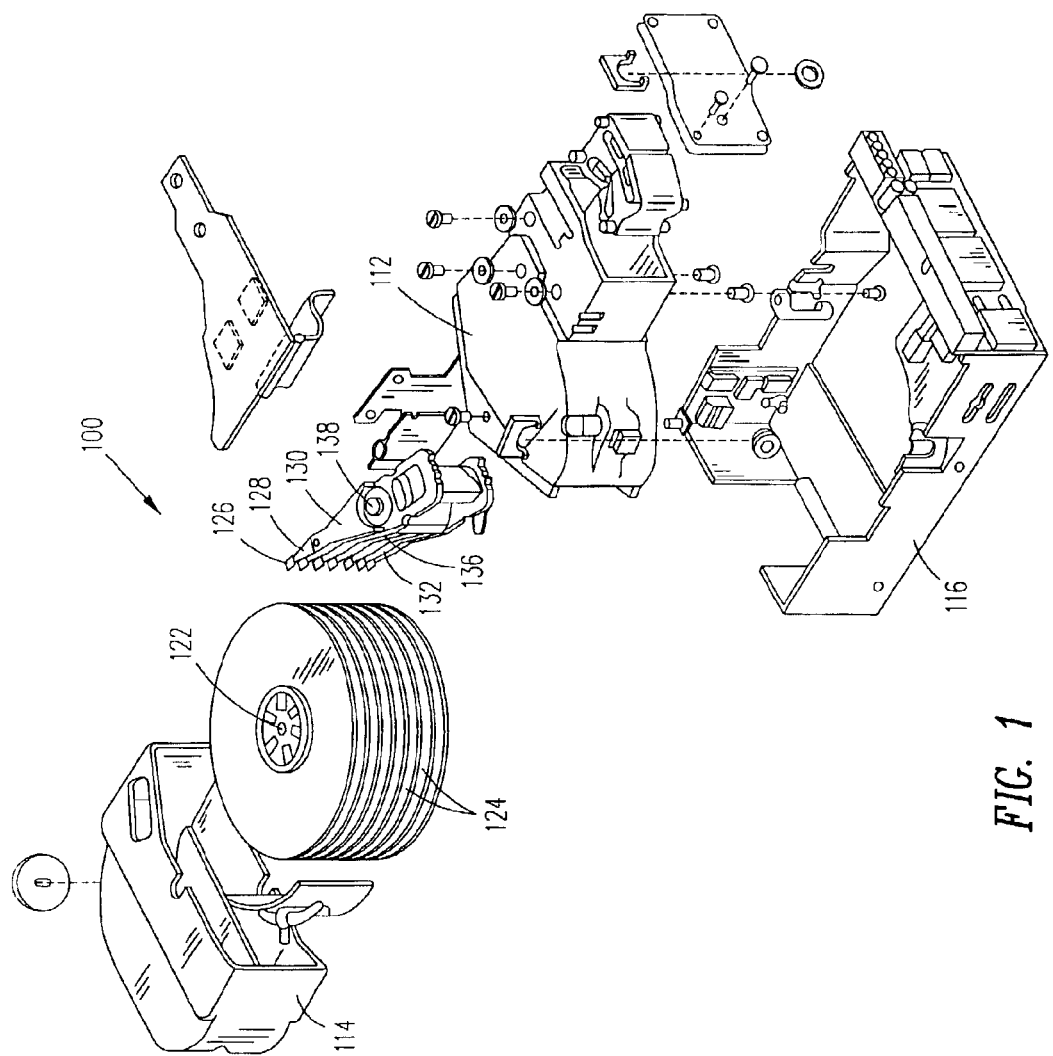
FIG. 1 is an exploded perspective view of an exemplary hard drive assembly including a slider.
Figure 2:
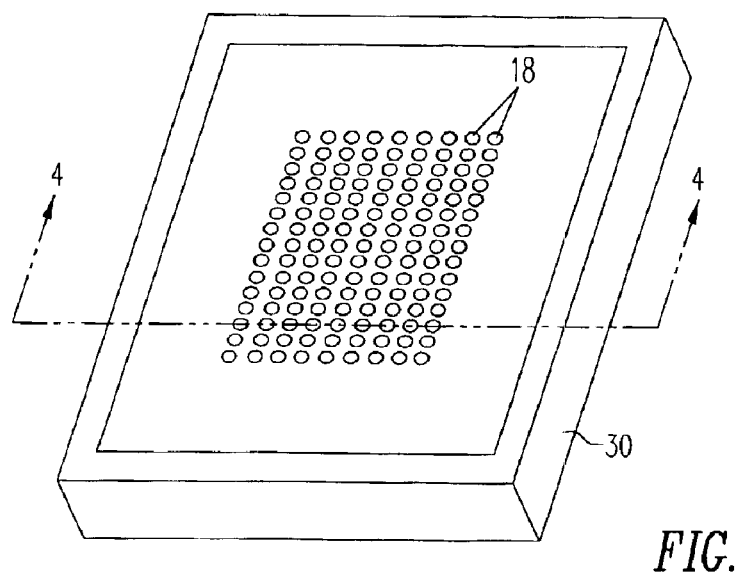
FIG. 2 is a perspective view of the vacuum chuck with the sliders in place.
Figure 3:
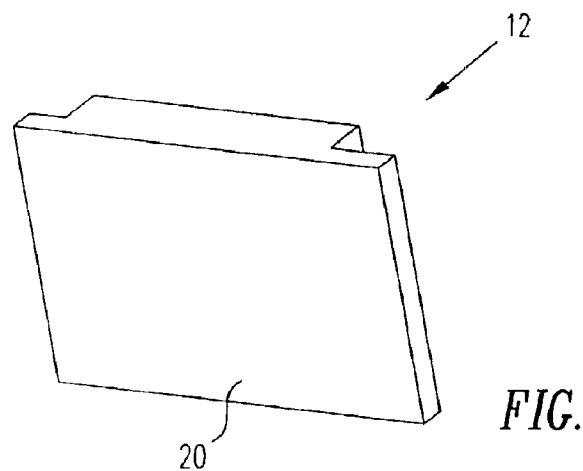
FIG. 3 is a perspective view of the carrier with the bi-layer encapsulating film.

As background, an exemplary HDA may be seen in FIG. 1, which is an exploded view of a disk drive 100. The disk drive 100 includes a housing 112 and a housing cover 114, which after assembly is mounted within a frame 116. Mounted within the housing is a spindle shaft 122. Rotatably attached to the spindle shaft 122 are a number of disks 124. In FIG. 1, eight disks 124 are attached to the spindle shaft 122 in spaced apart relation. The disks 124 rotate on spindle shaft 122, which is powered by a motor.

Information is written on or read from the disks 124 by heads or magnetic transducers, which are supported by sliders 126. Preferably, sliders in accordance with the invention are coupled to suspensions or load springs 128. The load springs 128 are attached to separate arms 130 on an E block or comb 132. The E block or comb 132 is attached at one end of an actuator arm assembly 136. The actuator arm assembly 136 is rotatably attached within the housing 112 on an actuator shaft 138.

To facilitate the read/write operations of the hard drive assembly and to ensure correct and constant fly height in varying conditions, slider designs can be very intricate. Various reliefs and protrusions are often patterned on sliders to enhance or improve aerodynamic character.

Figure 4:
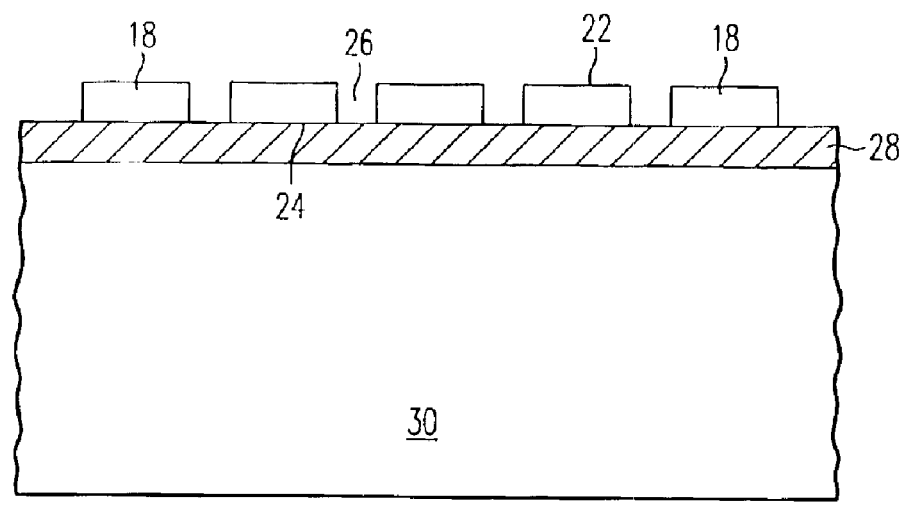
FIG. 4 is a cross-sectional view along line 4—4 in FIG. 2 of the sliders, adhesive, and vacuum chuck.

In the preferred embodiment of the present invention, sliders 18 are picked and placed with a robotic system onto an adhesive layer 28, which has been pre-placed on vacuum chuck 30. The sliders may be carefully aligned in a preset pattern on the adhesive layer to maximize space considerations or improve the ease with which process steps are completed. The ABS side 24 of sliders 18 is placed face down on the adhesive 28, as shown in FIG. 4. The adhesive 28 is an elastomer or high temperature tape (Nitto-Denko tape in the current embodiment) that has sufficient peel strength to hold the sliders 18 in place. With the ABS side 24 of the sliders 18 in contact with the adhesive layer 28, the sliders 18 are kept in position during heating. Because the sliders 18 are rigidly held by the adhesive layer 28 and the vacuum chuck 30, a high degree of coplanarity between the sliders is achieved during bonding when contact is made with carrier 12. Additionally, the robotic placement method of the current invention eliminates any chipping and cracking during bonding, which in turn increases slider yield.

Figure 5:
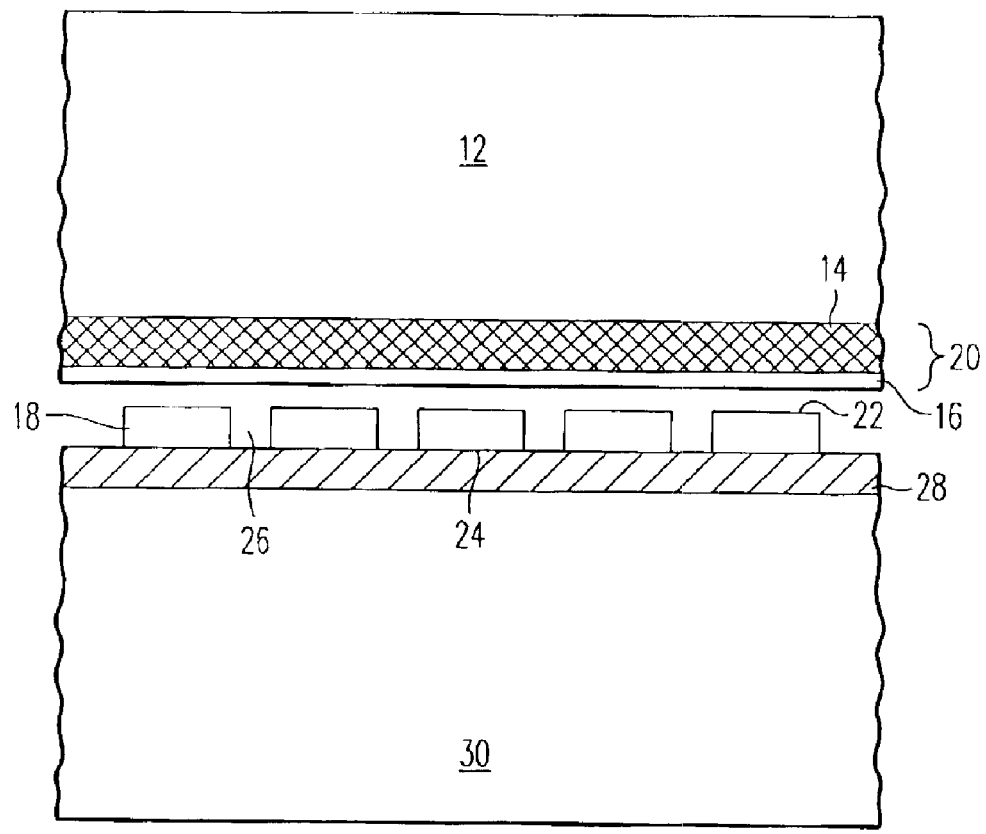
FIG. 5 is a cross-sectional view of the sliders, adhesive, and vacuum chuck, showing carrier with bi layer encapsulating film before the bonding process.
Figure 6:
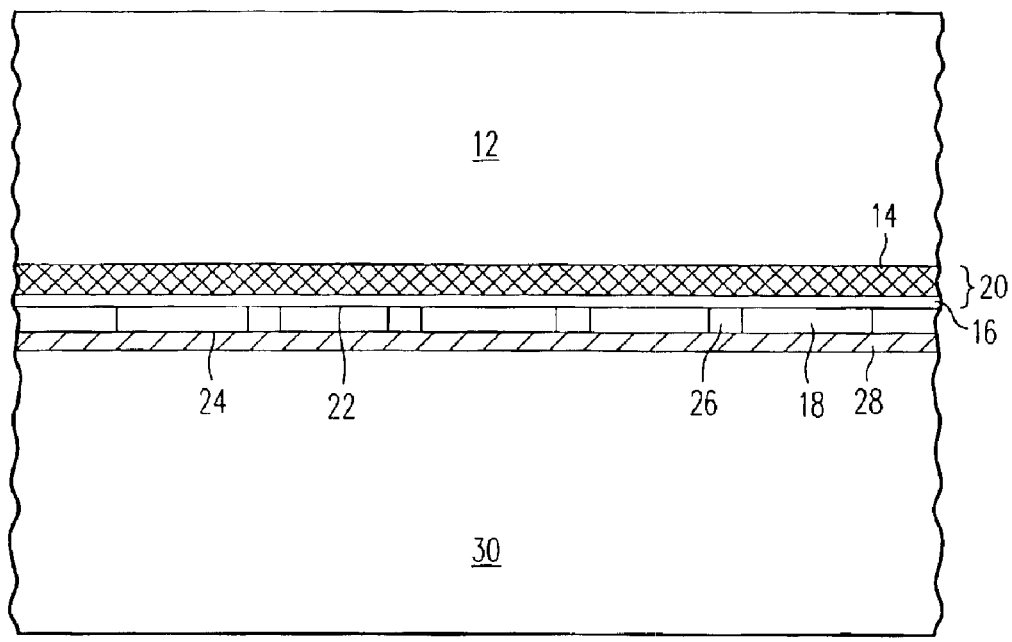
FIG. 6 is a cross-sectional view of the sliders, adhesive, vacuum chuck, and carrier, illustrating the process of bonding the aligned sliders onto an adhesive by heat-treating the bi-layer film through the carrier.

FIG. 5 shows the base plate or carrier 12 with the bi-layer film 20 positioned above the backside of this slider prior to the encapsulation process. FIG. 6 shows the base plate or carrier 12 which is laminated with a thermoplastic film layer 14, followed by a protective polymer film 16 in the preferred embodiment. The bi-layer film 20 comprising thermoplastic film layer 14 and polymer film layer 16 functions initially as an adhesive to achieve planarization. Carrier 12 is used as a "carrier" of the slider matrix/group of rows for photo processing. Planarization with step heights of less than 5 $\mu$m (compared to 20–30 $\mu$m in prior art process) can be achieved using a set of specific materials. The conductive thermoplastic film 14 is preferably Able Stick Conductive Thermal Plastic Film, or Able Stick ESD (Electrostatic discharge), approximately 200 $\mu$m thick. Polymer film 16 is preferably Polyethylene, approximately 75 $\mu$m thick. The semicrystalline nature of polymer film 16 renders the material chemically inert to the processing solvents, such as PGMEA and NMP, enabling it to withstand the air-bearing process steps. It should be understood by those skilled in the art that other polymer films (such as Polypropylene) may be used to accomplish the encapsulation process, without departing from the spirit or scope of the current invention. The lamination process of bi-layer film onto carrier 12 is preferably carried out using a hot vacuum laminator. The thermoplastic film 14 is vacuum laminated on top of the carrier 12; then the protective polymer film 16 is vacuum laminated on top of the joined thermoplastic film 14 and carrier 12. Vacuum lamination is used to eliminate air bubbles and to ensure quality planarization, which includes minimum step heights. The bi-layer film is an encapsulating film for achieving planarization of the sliders contained on the adhesive film.

A backside flow method is used with the bi-layer encapsulating film to planarize sliders, and to resist chemical attack from the front side 24 of the sliders 18 during photostrip. The carrier 12 with the bi-layer encapsulating film 20 is placed onto the backside 22 of the sliders 18, as shown in FIG. 6. After the bi-layer encapsulating film 20 is prepared, heat is applied above the melting temperature of the polymer film 16, but within the temperature limitations of the sliders 18. At these high temperatures (typically 120 degrees C.), the thermoplastic film layer 14 melts and flows, while the other layer 16 remains chemically inert. When the thermoplastic film 14 melts, it pushes down the chemically inert, polymer film 16 to flow into and fill the gaps 26 between the sliders 18. The chemically inert polymer film 16 protects the encapsulant, or thermoplastic film 14, from being attacked by the photostrip process. Additionally, this backside flow method bonds the aligned sliders 18 onto an adhesive 28 by heat-treating the bi-layer film 20 through the carrier 12. In order to achieve complete encapsulation of the sliders or rows on the vacuum chuck 30, pressure may be placed on the bi-layer film carrier 12 during the heating and backside flow process. This ensures uniform encapsulation across an array of sliders or rows, and prevents the formation of air bubbles between the adhesive 28 on the vacuum chuck 30 and the bi-layer encapsulant 20 during backside flow. Pressure on the carrier 12 may be effectuated by providing a weighted carrier (approximately 10 lbs) or by adding weight (approximately 10 lbs) to the carrier during the encapsulation process. Additionally, the entire backside flow encapsulation process can be performed in a vacuum (vacuum chamber) to ensure that no air bubbles form on or around sliders or rows. In the preferred embodiment both pressure on the carrier and a vacuum are used to ensure the absence of air bubbles in the resulting hardened encapsulating layer. It will be desirable to perform as many steps of the planarization process as possible in a vacuum such that contaminants, air bubbles, and incomplete encapsulation are less likely.

Figure 8:
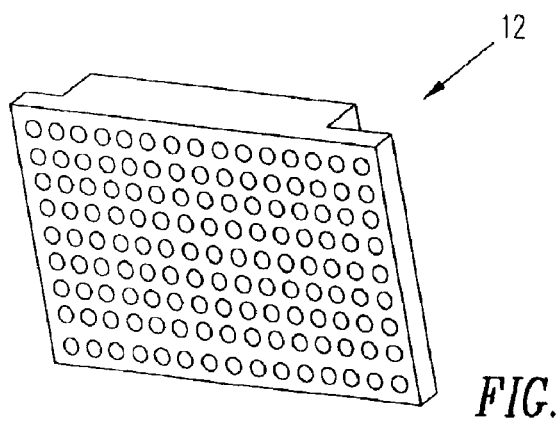
FIG. 8 is a perspective view of the carrier with the sliders after the adhesive layer is removed and before debond.

Under proper heating conditions (typically in the range of 120 degrees C. for sliders of approximately 1 mm×1.25 mm×0.3 mm in size), a minimum step height between sliders 18 is achieved (typically 3–5 $\mu$m), as opposed to prior art step heights on the order of 20 $\mu$m resulting from acrylate processes. After approximately ten minutes of exposure to high temperatures, the carrier 12 is allowed to cool for five minutes. After cooling, the thermoplastic film 14 hardens and planarization is achieved. The adhesive layer 28 is then peeled off. FIG. 8 shows the carrier 12 after the adhesive layer 28 is removed and before the debond process.

Figure 7:
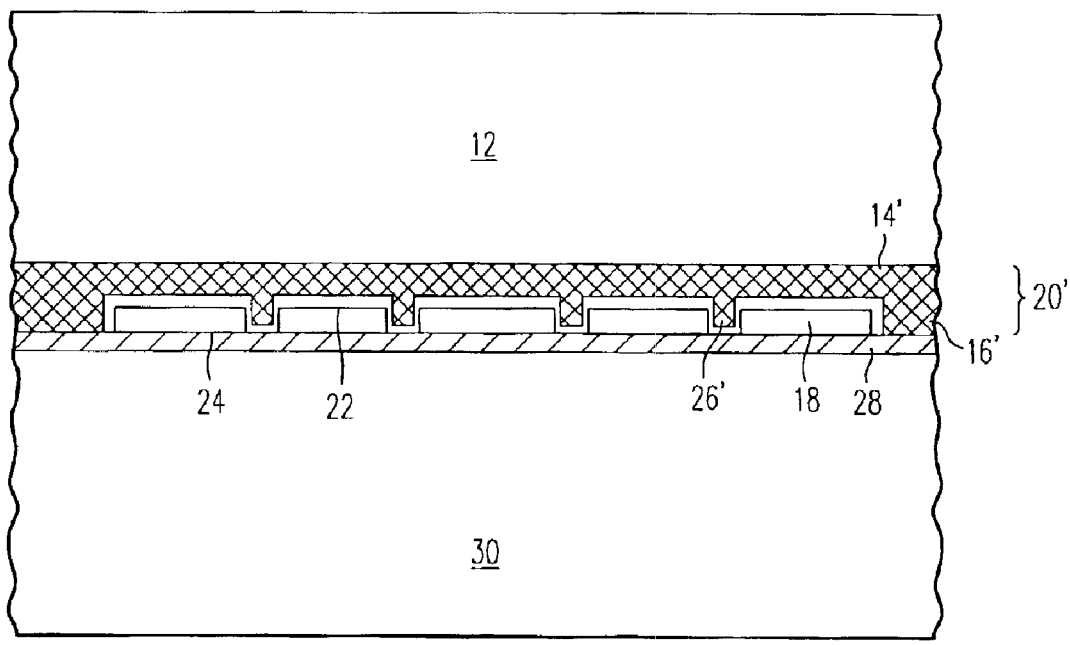
FIG. 7 is a cross-sectional view of the sliders, adhesive, vacuum chuck, and carrier subsequent to the bonding process, illustrating the encapsulation of the sliders.

In the preferred embodiment, the air-bearing pattering step is performed after complete planarization of the sliders is achieved in the foregoing steps. FIG. 7 shows the carrier 12, vacuum chuck 30, and sliders 18 subsequent to the bonding process, illustrating the encapsulation of the sliders 18. The carrier 12 is preferably used as a substrate for carrying out the air-bearing process steps, during which the carrier with the bi-layer film 20 is repositioned so that sliders 18 are on the top. Since the top most surface of the gap 26 between sliders 18 is protected by the chemically inert film 16 (e.g., polyethylene), the encapsulant 14 is resistant to PGMEA or NMP during strip/clean as the chemical is sprayed on top of the carrier 12. After application of liquid resist and the etching step, the remaining photoresist must be stripped and cleaned. Using a typical solvent such as PGMEA, zero material loss should occur after six minutes of scrubbing and spraying.

Following the completion of the air-bearing patterning, the sliders 18 are easily debonded from the carrier 12. According to an aspect of the present invention, the sliders can be debonded by chemical processes. Chemical debond includes the whole carrier 12 being immersed in a hot tank of NMP solvent at 82° C. with ultrasonic agitation. The NMP attacks the thermoplastic film 14' so that it dissolves. The polymer film (polyethylene) 16' releases or sluffs off from the side of the sliders as the thermoplasic film dissolves. A tray that matches the pitch of rows on the carrier 12 is clamped on top of the carrier 12. After the polymer film 16' releases from the sides of sliders 18, the sliders fall off into a tray which is positioned below the carrier 12 to catch the sliders 18 as they debond. An additional cleaning step is then performed on the removed sliders to remove excess residues from the slider surfaces. A solution of NMP with ultrasonic agitation may be used for this final cleaning step.

Alternatively, thermal debond followed by chemical cleaning can be used, especially in cases where sliders have been processed in rows rather than individually. The carrier 12 can be heated to a temperature above the melting point of the polymer film (polypropylene) 16' to remelt the encapsulant. As the encapsulant 20 melts, the contraction around sliders/rows from hardened encapsulant loosens, and the sliders/rows can be picked off with a robot or any other removal means. The sliders/rows are then loaded inside a tray or other holding mechanism so that they can be prepared for NMP and ultrasonic cleaning.

A process control system is used for process management, regulation, data manipulation, and other similar functions for the various elements of the method(s) disclosed in this invention. The process control device is preferably a computing unit, but could be any other mechanical or electronic device capable of such aforementioned functions.

Advantages of the current method in this present invention include the ease of debond. Because thermoplastic encapsulant can be chemically dissolved (or remelted in the case of slider rows), the debond process does not require large mechanical force or shearing. Chemical debond alone, or thermal melting followed by chemical cleaning will be sufficient. This reduces yield losses caused by chipping and cracking. Also, because polyethylene is chemically inert, it does not adhere to the sliders in the way acrylate does, so cleaning is made easier.

Another advantage in the current invention is the use of polyethylene as a release layer in the bi-layer encapsulant. Polyethylene does not stick to the sliders, thus there is no residue following debond as there is with a photo-curable acrylic encapsulant. Additionally, the use of polyethylene taught in this present invention has been successfully applied to both ceramic and silicon structures, whereas prior art encapsulant methods encounter difficulties when applied to silicon.

While the invention has been particularly shown and described with reference to the preferred embodiment, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. A planarization method for a substrate having a first surface for etching and a second surface, said method comprising the steps of:
    (a) supporting a layer of adhesive film on a retaining device;
    (b) positioning the substrate with said first surface against the adhesive film;
    (c) applying an encapsulating film to the second surface of the substrate;
    (d) flowing the encapsulating film to encapsulant whereby the encapsulant fills a space on the adhesive film adjacent the first surface of the substrate;
    (e) hardening the encapsulant;
    (f) removing the adhesive film to expose the first surface with adjacent encapsulant as a planarized surface.

2. The method as in claim 1, wherein the retaining device comprises a vacuum chuck.

3. The method as in claim 1, wherein said step of applying the encapsulating film comprises the steps of:
    (a) providing a base carrier having a flat surface;
    (b) supporting the encapsulating film on the flat surface;
    (c) applying the encapsulating film supported on the carrier to the second surface of the substrate.

4. The method as in claim 1, wherein said flowing step comprises the step of applying heat to the encapsulating film.

5. The method as in claim 4, further comprising the steps of applying heat to a base carrier supporting the encapsulating film thereby flowing film to encapsulant.

6. The method as in claim 5 further comprising the step of applying pressure to the base carrier during said flowing film to encapsulant thereby maximizing encapsulant coverage and reducing the formation of air bubbles within the encapsulant.

7. A planarization method for a substrate having a first surface for etching and a second surface, said method comprising the steps of:

(a) supporting a layer of adhesive film on a retaining device;

(b) positioning the substrate with said first surface against the adhesive film;

(c) applying an encapsulating film to the second surface of the substrate, wherein the encapsulating film comprises a bi-layer film;

(d) flowing the encapsulating film to encapsulant whereby the encapsulant fills a space on the adhesive film adjacent the first surface of the substrate;

(e) hardening the encapsulant;

(f) removing the adhesive film to expose the first surface with adjacent encapsulant as a planarized surface.

8. The method as in claim 7, wherein said step of applying the encapsulating film comprises the steps of:

providing a base carrier having a flat surface;

laminating a thermoplastic film layer to the flat surface; and laminating a release film layer to the thermoplastic film layer.

9. The method as in claim 8, wherein the steps of laminating the thermoplastic film layer and release film layer comprises the step of using a hot vacuum laminator.

10. The method as in claim 8, wherein the thermoplastic film layer comprises a conductive thermal plastic film.

11. The method as in claim 10, wherein the conductive thermal plastic film comprises Ablestick.

12. The method as in claim 8, wherein the release film layer comprises a chemically inert protective polymer film.

13. The method as in claim 12, wherein the chemically inert protective polymer film comprises at least one of Polyethylene and Polypropylene.

14. A planarization method for a substrate having a first surface for etching and a second surface, said method comprising:

supporting a layer of adhesive film on a retaining device;

positioning the substrate with said first surface against the adhesive film;

applying an encapsulating film to the second surface of the substrate;

flowing the encapsulating film to encapsulant whereby the encapsulant fills a space on the adhesive film adjacent the first surface of the substrate, wherein said flowing step comprises applying heat to the encapsulating film;

applying heat to a base carrier supporting the encapsulating film thereby flowing film to encapsulant;

hardening the encapsulant;

removing the adhesive film to expose the first surface with adjacent encapsulant as a planarized surface;

providing a release film layer to fill the space on the adhesive film adjacent the first surface of the substrate;

providing a thermoplastic film layer to fill the space on the adhesive film adjacent the first surface of the substrate on the opposite side of the release film layer;

cooling the substrate, the adhesive layer, and the base carrier with the encapsulant;

providing a hardened encapsulant layer; and removing the adhesive layer such that the first surface of the substrate is exposed.

15. The method as in claim 14, further comprising the step of forming surface patterns on the first surface.

16. The method as in claim 15, further comprising the step of debonding the substrate from the hardened encapsulating layer.

17. The method as in claim 16, wherein the step of debonding comprises a chemical debonding step of dissolving the hardened encapsulating layer thereby causing the substrate to release.

18. The method as in claim 17, further comprising the step of cleaning the substrate.

19. The method as in claim 16, wherein the step of debonding comprises the thermal debonding steps of:

(a) applying heat to the hardened encapsulating layer thereby flowing the hardened encapsulating layer to encapsulant, (b) removing the substrate from the encapsulant.

20. The method as in claim 19, further comprising the step of cleaning the substrate.

21. The method as in claim 19, wherein the step of removing the substrate comprises the step of providing a robotic device to remove the substrate.

22. A planarization method for a substrate having a first surface for etching and a second surface, said method comprising the steps of:

(a) supporting a layer of adhesive film on a retaining device;

(b) positioning the substrate with said first surface against the adhesive film;

(c) applying an encapsulating film to the second surface of the substrate;

(d) flowing the encapsulating film to encapsulant whereby the encapsulant fills a space on the adhesive film adjacent the first surface of the substrate;

(e) hardening the encapsulant;

(f) removing the adhesive film to expose the first surface with adjacent encapsulant as a planarized surface; and wherein the substrate is applied to the adhesive film by a robotic device.

23. A planarization method for a substrate having a first surface for etching and a second surface, said method comprising the steps of:

(a) supporting a layer of adhesive film on a retaining device;

(b) positioning the substrate with said first surface against the adhesive film;

(c) applying an encapsulating film to the second surface of the substrate;

(d) flowing the encapsulating film to encapsulant whereby the encapsulant fills a space on the adhesive film adjacent the first surface of the substrate;

(e) hardening the encapsulant;

(f) removing the adhesive film to expose the first surface with adjacent encapsulant as a planarized surface; and wherein at least said step of flowing the encapsulating film to encapsulant is performed in a vacuum.

* * * * *